United States Patent [19]

Marlett et al.

[11] Patent Number: 4,957,726

[45] Date of Patent: Sep. 18, 1990

[54] PREPARATION OF AMINE ALANES AND LITHIUM ALUMINUM TETRAHYDRIDE

[75] Inventors: Everett M. Marlett; Arcelio J. Malcolm; Won S. Park, all of Baton Rouge, La.

[73] Assignee: Ethyl Corporation, Richmond, Va.

[21] Appl. No.: 337,086

[22] Filed: Apr. 12, 1989

[51] Int. Cl.$^5$ .............................................. C01B 6/24
[52] U.S. Cl. ....................................... 423/644; 556/176
[58] Field of Search ......................... 423/644; 556/176

[56] References Cited

U.S. PATENT DOCUMENTS

| | | | |
|---|---|---|---|
| 2,955,126 | 10/1960 | Roscoe et al. | 556/176 |
| 3,159,626 | 12/1964 | Ashby | 260/242 |
| 3,180,700 | 4/1965 | Robinson | 23/14 |
| 3,326,955 | 6/1967 | Brendel et al. | 260/448 |
| 3,355,262 | 11/1967 | Beaird et al. | 23/365 |
| 3,535,107 | 10/1970 | Nelson et al. | 75/68 |
| 3,552,946 | 1/1971 | Brendel | 75/5 |
| 3,651,064 | 3/1972 | Nelson et al. | 260/270 |
| 3,764,666 | 10/1973 | Murib | 556/176 |
| 3,891,686 | 6/1975 | Ehrlick et al. | 556/176 |
| 4,152,401 | 5/1979 | Langer et al. | 423/644 |
| 4,474,743 | 10/1984 | Marlett | 423/347 |
| 4,529,580 | 7/1985 | Nelson | 423/644 |
| 4,665,207 | 5/1987 | Marlett | 556/176 |
| 4,748,260 | 5/1988 | Marlett | 556/176 |
| 4,793,382 | 11/1989 | Brendel | 260/448 |

FOREIGN PATENT DOCUMENTS 1245361 9/1960 France .

OTHER PUBLICATIONS

Wiberg, Graf, and Uson, *Zeitschrift fur Anorganische und Allgemeine Chemie* 272, 221–232 (1953) (English translation enclosed.).
Ruff and Hawthorne, *J. Am. Chem. Soc.* 82, 2142 (1960).
Dilts and Ashby, *Inorg. Chem.* 4, 855 (1970).
Peters, *Can. J. Chem.* 42, 1755 (1964).
Ehrlich and Rice, *Inorg. Chem.* 5, 1284 (1966).
Ashby, Brendel, and Redman, *Inorg. Chem.* 2, 499 (1963).
Finholt, Bond, and Schlesinger, *J. Am. Chem. Soc.* 69, 1199 (1947).
Ashby and Kobetz, *Inorg. Chem.* 5, 1615, (1966).

Primary Examiner—Robert L. Stoll
Assistant Examiner—Wayne A. Langel
Attorney, Agent, or Firm—John F. Sieberth, Jr.; Richard J. Hammond

[57] ABSTRACT

Lithium aluminum hydride reacts with a tertiary amine to produce an amine alane and $Li_3AlH_6$. Lithium values are recycled by reacting $Li_3AlH_6$ with aluminum and hydrogen to produce $LiAlH_4$. Since no metal halide by-product is produced in the first step, it has an advantage over other routes. The amine alane can react with $SiF_4$ to produce silane and $AlF_3$.

25 Claims, No Drawings

PREPARATION OF AMINE ALANES AND LITHIUM ALUMINUM TETRAHYDRIDE

TECHNICAL FIELD

This invention relates to the production of tertiary amine alanes and the subsequent regeneration of the starting aluminum-containing compound.

BACKGROUND

Amine alanes, complexes of tertiary amines with $AlH_3$, are used in various reduction processes, in the preparation of aluminum, and in the production of silane. See, for example, Marlett, U.S. Pat. No. 4,474,473, issued Oct. 2, 1984; Brendel, U.S. Pat. No. 3,552,946, issued Jan. 5, 1971.

The production of amine alanes has been accomplished by several methods (see Nelson, Becker, and Kobetz, U.S. Pat. No. 3,651,064, issued Mar. 21, 1972, and references therein).

Dilts and Ashby, *Inorg. Chem.* 9(4), 855 (1970), in a study of complex metal hydrides in tertiary amine solvents, found that trimethylamine extracted alane from lithium aluminum hydride, $LiAlH_4$, to produce an amine alane, $AlH_3.2N(CH_3)_3$, in a yield of 30% after one month. In diethyl ether solution the one-month yield was 98%. At 0.C in diethyl ether solution, the 24-hour yield was only 27%. In benzene, $Li_3AlH_6$ was produced, but the amine-containing product was not characterized. Other amines effected no extraction of alane; the product of reacting $LiAlH_4$ with other amines, if any, was an adduct of $LiAlH_4$. The effective use of solutions of amine alane is complicated by the presence of soluble lithium in the amine complex, for example, a soluble amine adduct of $LiAlH_4$.

Dilts and Ashby, in the same study, were unsuccessful in extracting alane from sodium aluminum tetrahydride by any amine.

Other workers (Peters, *Can. J. Chem.* 42, 1755 (1964); Ehrlich and Rice, *Inorg. Chem.* 5, 1284 (1966)) did not effect the extraction of $AlH_3$ from $LiAlH_4$ by any tertiary amine other than trimethylamine. Moreover, with this amine, either the yields were quite low or the reaction time was unfeasibly long. Also, of course, dealing with the gaseous amine reactant involves greater difficulty and inconvenience than with a liquid.

Lithium aluminum tetrahydride may be prepared as described by Finholt, Bond, and Schlesinger, *J. Am. Chem. Soc.* 69, 1199 (1947), by the reaction of LiH with $AlCl_3$ in diethyl ether. It also may be produced, as taught by Ashby et al., *Inorg. Chem.* 2, 499 (1963), by the reaction of lithium hydride with aluminum and hydrogen in tetrahydrofuran or diglyme. A drawback to this method is the difficulty of removing all of the solvent from the product. Another route is the reaction of lithium chloride with sodium aluminum tetrahydride, as taught by Robinson (French Patent No. 1,245,361, 1960).

In one process for preparation of sodium aluminum tetrahydride, aluminum and hydrogen react with the hexahydride, $Na_3AlH_6$, under pressure, as taught by Beaird and Kobetz, U.S. Pat. No. 3,355,262, issued Nov. 28, 1967.

THE INVENTION

A new process is now provided for the production of amine alanes by a relatively simple method, under convenient conditions and in commercially feasible short reaction times. This process is characterized by production of an amine alane in solution so that the desired product is easily separated from the solids of the reaction. Another feature of the process of this invention is the conversion of the only by-product of significance for use again as a reactant, thus offering the advantage of a circulating inventory of materials used in the process. The amine alane produced may be recovered from solution, but is most conveniently used as the solution in subsequent reactions.

In the process of this invention, lithium aluminum tetrahydride reacts with tertiary amine under anhydrous conditions, producing amine alane and the substantially insoluble lithium aluminum hexahydride. The insoluble compound is easily separated from the desired product. The lithium aluminum hexahydride is then reacted with aluminum and hydrogen under pressure, thus providing again the starting material, lithium aluminum tetrahydride. In a preferred embodiment of the invention, the lithium aluminum tetrahydride product of the second step is used as reactant in another first step of the invention. In another preferred embodiment of the invention the reaction of the first step and the reaction of the second step are each conducted in an inert liquid medium (inert in the sense that it does not impede the reaction). For best results the reaction of the first step is carried out in a liquid medium in which the lithium aluminum tetrahydride is also insoluble, and the reaction of the second step is carried out in a liquid medium in which the lithium aluminum tetrahydride is at least slightly soluble.

The amine used as reactant in this invention can be any tertiary amine which produces an amine alane in reaction with lithium aluminum hydride, or any mixture of such amines. Typical of the amines which can be used are trimethyl amine, N,N-dimethylethylamine, N,N-diethylmethylamine, N-methylpyrrolidine, N,N-dimethylpropylamine, N,N-dimethylbutylamine, other mixed dimethylalkyl amines, 3-methyl-N-methylpyrrolidine, and the like. Most highly preferred are N,N-dimethylethylamine and N-methylpyrrolidine. These amines are both liquids at room temperature, are uncomplicated molecules, and are readily available and easily handled. See co-pending application Ser. No. 337,085, filed Apr. 12, 1989.

Tertiary amines in general are effective in forming soluble aluminum-containing products when reacted with lithium aluminum tetrahydride. However, in some cases, given tertiary amines tend to solubilize the lithium hydride species along with the aluminum hydride species. Accordingly, the suitability of any given tertiary amine for use in the practice of this invention can readily be determined by the simple expedient of performing a few preliminary tests.

Proportions of reactants in the first step of the process of this invention may be varied, but generally the mole ratios of lithium aluminum tetrahydride to amine will fall within the range of from about 1:2 to about 1:20. Most preferred is a mole ratio of about 1:2.

The amine and the lithium aluminum tetrahydride may be added together in stoichiometric amounts, or excess amine may be used as a liquid reaction medium, but the preferred practice is to use an ether or aromatic hydrocarbon or admixture thereof as a diluent, forming a solution or suspension with lithium aluminum tetrahydride. The liquid is preferably added in amounts of from about 4 parts (by weight) per part of lithium aluminum tetrahydride to about 25 parts per part of LiAlH4 Most preferred amounts are about 8 parts per part of LiAlH4.

Various ethers may be used to comprise the diluent, either singly or in admixture, for example, diethyl ether, dipropyl ether, di-isopropyl ether, ethyl propyl ether, methyl propyl ether, dibutyl ether, ethyl butyl ether, glyme, diglyme, dimethoxypropane, and the like, as well as 1,4-dioxane, 1,3-dioxolane, tetrahydrofuran, 2-methyltetrahydrofuran, 3-methyltetrahydrofuran, 2,5-dimethyltetrahydrofuran, and similar substances. Non-cyclic ethers are preferred, especially diethyl ether, for use in the first step of the process. However, because the desired product is produced in better yield and higher purity in those solvents which do not easily dissolve lithium aluminum tetrahydride, aromatic hydrocarbons are particularly preferred, especially mononuclear aromatic hydrocarbons. Among those which can be used, either singly or in admixture, are benzene, toluene, ethylbenzene, propylbenzene, isopropylbenzene, butyl benzenes, xylenes, mesitylene, higher alkyl and dialkyl benzenes, 1-methylnaphthalene, 1,2,3,4-tetrahydronaphthalene, and similar compounds. One convenient solvent is the commercially available mixture of benzene, toluene, and xylene, commonly known as BTX. Mixtures of hydrocarbons predominating in aromatic components but with minor amounts of aliphatic or cycloaliphatic components may also be used. Mixtures of ethers and hydrocarbons may also be used. Toluene is most highly preferred. Other solvents which are inert (in the sense that they do not deter the reaction) and in which the amine alane is soluble, but which do not solubilize the lithium aluminum tetrahydride may also be used.

The lithium aluminum tetrahydride is a commonly used reagent and is available commercially. Methods for its synthesis are known in the literature (see above), but in the course of the process of the present invention, lithium aluminum tetrahydride is produced from the lithium aluminum hexahydride by-product resulting from an earlier step.

Preferably, the reactions of both steps of the process of this invention are conducted under substantially anhydrous conditions, but trace amounts of moisture, as might normally be found in industrial reagents used for similar purposes, are acceptable.

The temperature and pressure conditions under which the reaction of the first step of the process of this invention is conducted may be varied widely. Any convenient temperature which is effective may be used. The preferred temperature is a range from about 0.C to about 80 C, provided that the reaction mixture is liquid; room temperature or ambient temperature is highly preferred.

For the first step of the process any effective pressure, from as low as the vapor pressure of the reaction mixture at the temperature of the reaction to about 150 pounds per square inch, or to the pressure capacity of the reaction vessel, may be used, but the preferred pressure is near atmospheric pressure, or that pressure which is developed in the closed reaction vessel under the reaction conditions.

In the reaction of the second step of the process of this invention, reactant proportions may also be varied widely. The aluminum to lithium aluminum hexahydride mole ratio may be in the range of from about 2:1 to about 8:1, but the preferred mole ratio is about 2:1, in accordance with the stoichiometry of the equation $$Li_3AlH_6 + 2 Al + 3 H_2 \rightarrow 3 LiAlH_4.$$

The hydrogen is consumed in substantially the proportions indicated by the equation.

The aluminum is preferably in a powder or highly subdivided particle form in order to provide sufficient surface for the reaction to proceed at a commercially feasible fast reaction rate. It is preferable also for the aluminum to be activated by previous treatment. For best results a catalyst is provided which will assist in the conduct of the reaction, either by shortening the induction period for the initiation of the reaction, or by enhancing the rate of the reaction, once initiated, or both. Such catalysts are well known, and may be of at least two classes. In the first class are reaction-promoting elements from Group IV-B or Group V-B as set forth in the periodic chart of the elements published by Fisher Scientific Company. Thus, titanium, vanadium, zirconium, hafnium, niobium, and tantalum may be used either individually or in combination; of these titanium and vanadium are preferred, titanium being the most preferred reaction promoter. In a preferred feature, titanium is introduced into the system in the form of a titanium-containing aluminum alloy, where the titanium is present in an amount from about 1000 to 4000 parts per million. Catalysts of the second class are any of a wide variety of compounds falling into the categories of alkyl compounds of alkali metals, hydride or alkyl compounds of alkaline earth metals, alkyl compounds of aluminum, and the like. For example, an organometallic material such as ethylsodium, sodium tetraethylaluminum, or the complex of sodium hydride and triethylaluminum can be used. However, in order to avoid working with a mixed system, an alkyl compound of aluminum is highly preferred. Such substance is provided in minor and catalytic proportions, of the order of about 0.05 to about 5 volume percent of the liquid reaction medium.

The lithium aluminum hexahydride is a crystalline material which is substantially insoluble in the liquids used as reaction media. In the process of this invention, it is produced as an insoluble by-product in the first step of the reaction, and is preferably used from that source as the reactant in the second step, but of course it may also be obtained from other sources. It is easily recovered by separating it from the desired product of the first step by filtration, decantation, centrifugation, or like processes.

The liquid reaction medium for the reaction of the second step of the process of this invention is preferably added in amounts of from about 5 parts (by weight) per part of lithium aluminum hexahydride to about 50 parts per part of $Li_3AlH_6$. Most preferred amounts are about 25 parts per part of $Li_3AlH_6$. The medium may be predominantly ether, aliphatic hydrocarbon, aromatic hydrocarbon, or admixtures thereof. Among the liquids which can be used, either singly or in admixture, are those described above in connection with the reaction of the first step of the invention. This invention is not limited by any theoretical considerations whatsoever. However, the second stage of the process of this invention seems to proceed more readily in a liquid reaction medium in which lithium aluminum tetrahydride is at least slightly soluble. Because the hexahydride is so insoluble in the reaction media, as is the aluminum, it is likely that formation of a soluble product at the surface (rather than an insoluble one) would enhance the reaction by enabling renewed surface to be formed. Accordingly, ether or mixtures of ethers and hydrocarbons are preferred, and saturated cyclic ethers such as tetrahydropyran, 1,4-dioxane, and particularly tetrahydrofuran (THF) or liquid alkyltetrahydrofurans are most highly preferred. Other solvents or mixtures which are inert (in the sense that they do not deter the reaction), and which do at least slightly solubilize the lithium aluminum tetrahydride may also be used.

In carrying out the process of the second step of this invention, an elevated pressure of hydrogen is used, which can be from several atmospheres up to, for example, about 10,000 pounds per square inch. Preferred pressures are in the range of from about 1000 to about 5000 pounds per square inch, and the range of about 2000 to about 5000 pounds per square inch is highly preferred.

The temperature of the reaction of the second step of this invention is elevated, usually in the range of from about 80° C. to about 160° C., but, of course, it may vary depending on the conditions of the reaction. Depending on the liquid medium used, the preferred temperature range may vary. The most preferred temperature range used with THF reaction medium is from about 120° C. to about 140° C. Some ether reaction media, particularly diethyl ether, should not be used for the higher temperature operations because of the instability of the lithium aluminum tetrahydride in the presence of aluminum powder [Ashby et al., *Inorg. Chem.* 2, 499, (1963)].

The following examples illustrate the preferred embodiment of this invention but are not intended to limit the scope of the invention.

EXAMPLE 1

For an extraction with trimethylamine, 1.0 gram (0.026 mole) of lithium aluminum tetrahydride was placed in a 350 mL stainless steel flask, and the flask was evacuated and connected to a reservoir of dry trimethylamine. The flask was immersed in a dry ice/acetone mixture and 20 g (0.33 mole) of trimethylamine was condensed into it. The flask was sealed and stored at room temperature for 20 days, with intermittent shaking for 1 hour periods. Subsequently, the trimethylamine was vented off, 25 mL dry toluene was added and the mixture was shaken another 4 hours. The resulting slurry was filtered and the cake was rinsed with a little more toluene. The filtrate was weighed and analyzed for active hydrogen, lithium, and aluminum. The H/Al mole ratio was 2.9 and the Li/Al ratio was 1/7.5. Conversion of lithium aluminum tetrahydride to amine alane was approximately 87%. The dry cake was weighed and analyzed for crystalline phases by X-ray powder diffraction; it was found to contain only $Li_3AlH_6$.

EXAMPLE 2

Extractions with N,N-dimethylethylamine were made in a 35 mL Fischer & Porter glass aerosol reactor. In one case 1.9 g lithium aluminum tetrahydride (0.05 mole) was dissolved in 11.9 g dry diethyl ether and this solution placed in the reactor. To this solution 7.3 g (0.10 mole) dry N,N-dimethylethylamine was added slowly with stirring. A white precipitate formed immediately. The reactor was sealed and the mixture stirred overnight at room temperature. The product slurry was filtered and the cake was rinsed well with about 15 g dry toluene. The clear filtrate and the dry cake were weighed and analyzed as before. X-ray powder diffraction analysis showed that the filter cake contained only $Li_3AlH_6$ In the filtrate the H/Al mole ratio was 3.15 and the Li/Al ratio corresponded to a mole ratio in the product of 57 $AlH_3$/43 $LiAlH_4$. After accounting for the presence of soluble lithium the amine alane yield was about 66%.

EXAMPLE 3

Another extraction employed the same technique except that the mixture of 1.9 g lithium aluminum tetrahydride (0.05 mole), 15 g dry toluene and 7.3 g N,N-dimethylethylamine (0.10 mole) was stirred overnight in the absence of any ether. After filtration, the cake was washed with about 10 g of fresh toluene. Analyses of the filtrate and dry cake were carried out as before. X-ray powder diffraction analysis of the filter cake showed a strong pattern for $Li_3AlH_6$. In the filtrate, the H/Al mole ratio was 3.13 and the Li/Al ratio corresponded to a mole ratio in the product of 95 $AlH_3$/5 $LiAlH_4$. The amine alane yield was approximately 96%.

Similar procedures using slightly greater amine to lithium aluminum tetrahydride ratios gave similar high yields at room temperature and somewhat lower yields at elevated temperature. In examples 4–8, 13.2 millimoles of $LiAlH_4$ and 46 millimoles of N,N-dimethylethylamine were reacted in toluene. In examples 6 and 7, aluminum powder was also added (18.5 millimoles, containing 0.19% titanium).

| Example | Temperature °C. | Time Hr. | Yield of Amine Alane % |
|---|---|---|---|
| 4 | 25 | 12 | 94 |
| 5 | 50 | 12 | 64 |
| 6 (Al added) | 25 | 12 | 77 |
| 7 (Al added) | 50 | 12 | 70 |
| 8 | 25 | 16 | 86 |

EXAMPLE 9

To a 50 mL round bottom flask were added 1.9 g lithium aluminum tetrahydride (powder, 95+%, 0.05 mole), 20.0 g dry toluene, 8.5 g N-methylpyrrolidine (distilled from sodium aluminum hydride, 0.10 mole). The flask was stoppered and agitated magnetically in the glove box under nitrogen. The reaction mixture was filtered, and the filtrate and solid were weighed and analyzed as before. The filter cake analysis showed a strong pattern for $Li_3AlH_6$. The filtrate analysis showed a mole ratio in the product of 95 $AlH_3$/5 $LiAlH_4$, and gave an amine alane yield of approximately 83%.

EXAMPLE 10

To a 100 mL round bottom flask were added 1.14 g lithium aluminum tetrahydride (0.030 mole), 20 mL of dry toluene and 3.6 g of N,N-diethylmethylamine (0.041 mole). The mixture was stirred at room temperature for 24 hours in the glove box. The reaction mixture was filtered, and the filtrate and solid were analyzed as before. The analysis for soluble aluminum was high, but the amine alane yield was only about 12% after accounting for the presence of soluble lithium aluminum hydride-tertiary amine adduct.

EXAMPLE 11

To a 50 mL round bottom flask were added 1.14 g lithium aluminum tetrahydride (powder, 95+%, 0.03 mole), 20 mL dry toluene, and 7.3 g triethylamine (distilled from sodium aluminum hydride, 0.072 mole). The flask was stoppered and stirred magnetically overnight in the glove box under nitrogen. The reaction mixture was filtered, and the filtrate and solid were analyzed as before. Again, the analyses for soluble aluminum and soluble lithium were very high, but the yield of amine alane was less than 1%.

EXAMPLE 12

Hydrogenation was carried out in a 45 mL stainless steel Parr screw cap reactor equipped with a Teflon-coated magnetic stirring bar. To the reactor were added 0.55 g (0.010 mole) lithium aluminum hexahydride, 0.55 g (0.020 mole) aluminum powder containing 0.19% titanium, 12.5 g dry solvent (tetrahydrofuran (THF) or toluene) and 0.05 mL (0.4 mmole) triethylaluminum as catalyst. The reactor was capped securely, flushed well with hydrogen, and placed in a tightly fitting electrical heater. The reactor was pressurized to about 1450 pounds per square inch with high purity hydrogen. Agitation was begun and the reactor was heated to the preset operating temperature of 120° C. for overnight operation (16 hours). The reactor was cooled, opened in the glove box, and the product mixture was weighed and filtered under vacuum. With THF solvent, the filtrate was weighed and split for analysis by acidic gas evolution and by inductively coupled plasma (ICP) emission spectrometry. With toluene solvent the cake was suspended in dry THF to dissolve lithium aluminum tetrahydride, then worked up as before. The analyses for active hydrogen, lithium, and aluminum showed that the conversion of lithium aluminum hexahydride to soluble lithium aluminum tetrahydride was 51% with THF and 24% with toluene.

EXAMPLE 13

Hydrogenation was carried out using a 300 mL autoclave in a manner similar to that of Example 12. The amounts used were: 0.95 g (0.0175 mole) lithium aluminum hexahydride, 3.00 g. (0.111 mole) aluminum powder containing 0.19% titanium, 50 mL (44 g) dry THF, and 0.05 mL (0.4 mmole) triethylaluminum. The hydrogen pressure was 4700 pounds per square inch, and the temperature was maintained at 135° C. for a 12-hour period. Analysis as before showed 80% conversion to lithium aluminum tetrahydride.

EXAMPLE 14

The procedure of Example 13 was repeated except that the temperature was maintained at 120° C. Analysis showed 78% conversion to lithium aluminum tetrahydride.

EXAMPLE 15

The procedure of Example 13 was repeated except that the temperature was maintained at 140° C. Analysis showed 75% conversion to lithium aluminum tetrahydride.

As readily can be seen, various aspects of the invention may be altered without departing from the spirit and scope of this invention.

What is claimed is:
1. A process which comprises, in combination:
(a) reacting lithium aluminum tetrahydride and a tertiary amine such that an amine alane and lithium aluminum hexahydride are produced, and
(b) reacting lithium aluminum hexahydride from the reaction of (a) with aluminum and hydrogen under pressure such that lithium aluminum tetrahydride is produced.

2. A process of claim 1 wherein at least a portion of the lithium aluminum tetrahydride produced in the reaction of (b) is recycled for use in the reaction of (a).

3. A process of claim 1 wherein the reaction of (a) is conducted in a liquid reaction medium in which lithium aluminum hexahydride is substantially insoluble.

4. A process of claim 1 wherein the reaction of (a) is conducted in a liquid reaction medium, said medium being predominantly a mixture of one or more aromatic hydrocarbons or a mixture of one or more ethers or a mixture of both.

5. A process of claim 4 wherein said reaction medium is predominantly a mixture of one or more aromatic hydrocarbons.

6. A process of claim 4 wherein said reaction medium is predominantly toluene.

7. A process of claim 4 wherein said reaction medium is predominantly diethyl ether.

8. A process of claim 1 wherein the tertiary amine is trimethylamine.

9. A process of claim 1 wherein the tertiary amine is N,N-dimethylethylamine.

10. A process of claim 1 wherein the tertiary amine is N-methylpyrrolidine.

11. A process of claim 1 wherein the reaction of (b) is conducted in the presence of a reaction-promoting element from Group IV-B or Group V-B.

12. A process of claim 11 wherein said reaction promoter is metallic titanium introduced into the reaction of (b) as a titanium-containing alloy of aluminum.

13. A process of claim 1 wherein the reaction of (b) is conducted in the presence of a catalyst.

14. A process of claim 13 wherein said catalyst is an aluminum alkyl.

15. A process of claim 13 wherein said catalyst is trialkylaluminum.

16. A process of claim 13 wherein said catalyst is triethylaluminum.

17. A process of claim 1 wherein the reaction of (b) is conducted in a liquid reaction medium stable under the conditions of the reaction.

18. A process of claim 17 wherein the reaction medium comprises at least in part an ether.

19. A process of claim 17 wherein the reaction medium is predominantly a liquid tetrahydrofuran.

20. A process of claim 1 wherein the reactants of (b) are at a pressure in about the range of 2000 to 5000 psi and at about the temperature of 120° C. to 140° C., such that lithium aluminum tetrahydride is produced.

21. A process of claim 1 wherein the reaction of (b) is conducted in the presence of an amount of triethylaluminum sufficient to promote the reaction, in a liquid reaction medium which is predominantly tetrahydrofuran, at a pressure in about the range of 2000 to 5000 pounds per square inch and at about the temperature of 120 C to 140 C, such that lithium aluminum tetrahydride is produced.

22. A process which comprises, in combination:
(a) reacting lithium aluminum tetrahydride and a tertiary amine in a liquid aromatic hydrocarbon reaction medium such that an amine alane and lithium aluminum hexahydride are produced,
(b) reacting lithium aluminum hexahydride from the reaction of (a) with aluminum and hydrogen under pressure in a liquid ether reaction medium such that lithium aluminum tetrhydride is produced, and (c) recycling to the reaction of (a) at least a portion of the lithium aluminum tetrahydride produced in the reaction of (b).

23. A process of claim 22 wherein
(1) the reaction of (a) is conducted in a liquid reaction medium which is predominantly a mononuclear aromatic hydrocarbon, and
(2) the reaction of (b) is conducted in a liquid reaction medium which is predominantly a saturated cyclic ether, in the presence of an amount of an aluminum alkyl sufficient to promote the reaction, at a pressure in about the range of 2000 to 5000 pounds per square inch and at about the temperature of 120° C. to 140° C., such that lithium aluminum tetrahydride is produced.

24. A process of claim 23 wherein the aromatic hydrocarbon is toluene, the cyclic ether is tetrahydrofuran, and the aluminum alkyl is triethylaluminum.

25. A process of claim 23 wherein the aluminum employed in the reaction of (b) contains a minor reaction-promoting amount of titanium.

* * * * *

UNITED STATES PATENT AND TRADEMARK OFFICE
CERTIFICATE OF CORRECTION

PATENT NO. : 4,957,726

DATED : September 18, 1990

INVENTOR(S) : Everett M. Marlett et al

It is certified that error appears in the above-identified patent and that said Letters Patent is hereby corrected as shown below:

On the title page, under column entitled "U.S. Patent Documents, line 10 reads "Ehrlick et al. . . . 556/176" and should read
-- Ehrlick et al. . . . 260/448 --.

On the title page, under column entitled "U.S. Patent Documents", line 16 reads "4,793,382  11/1989 Brendel" and should read
-- 3,479,382  11/1969 Brendel --.

Column 8, line 68 reads "tetrhydride" and should read
-- tetrahydride --.

Signed and Sealed this

Fourth Day of August, 1992

Attest:

DOUGLAS B. COMER

*Attesting Officer*     *Acting Commissioner of Patents and Trademarks*